No. 816,410. PATENTED MAR. 27, 1906.
G. W. WILLIAMS.
LINE REEL.
APPLICATION FILED APR. 23, 1904.

Witnesses:

Inventor
G. W. Williams.
By  
Attorneys.

UNITED STATES PATENT OFFICE.

GEORGE W. WILLIAMS, OF BRADDOCK, PENNSYLVANIA.

LINE-REEL.

No. 816,410.　　　Specification of Letters Patent.　　　Patented March 27, 1906.

Application filed April 23, 1904. Serial No. 204,503.

*To all whom it may concern:*

Be it known that I, GEORGE W. WILLIAMS, a citizen of the United States of America, residing at Braddock, in the county of Allegheny and State of Pennsylvania, have invented certain new and useful Improvements in Line-Reels, of which the following is a specification, reference being had therein to the accompanying drawings.

This invention has relation to clothes-line reels, and has for its object the provision of means for reeling a line and keeping the same in reeled condition in a receptacle whereby it will be protected from the weather and will be at any time available when it is desired to stretch the line for the usual purposes.

In order to facilitate the location of the reel in a convenient position, I mount the same in a box-like receptacle provided with convenient means for attaching it to a fence, post, wall, or other object, and I so construct the reel and the parts appertaining thereto that the reel may be both wound and unwound without opening the receptacle or exposing any part of the line other than that which it is desired to stretch for the reception of clothes to be hung thereon.

I have illustrated my invention in the accompanying drawings, in which—

Figure 1:
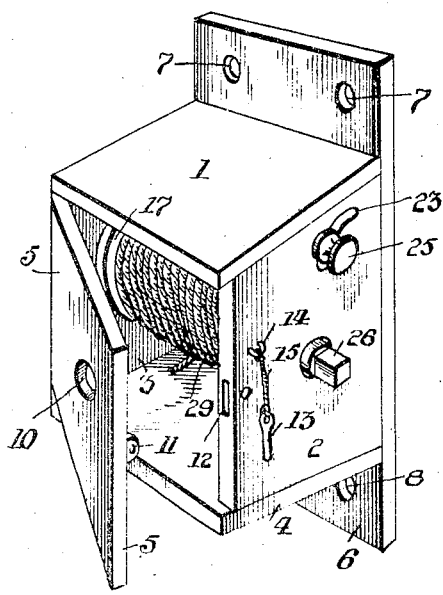
Figure 2:
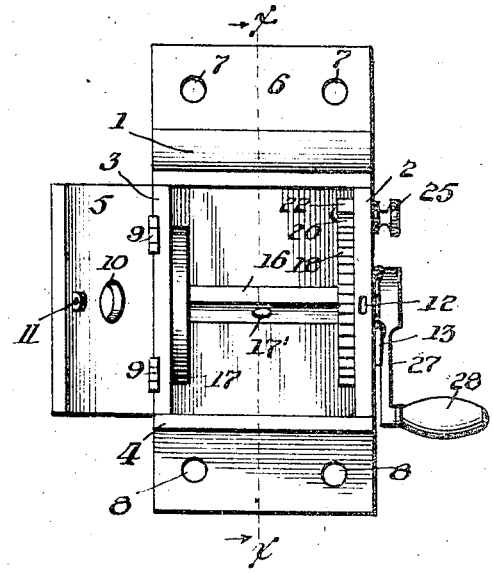
Figure 3:
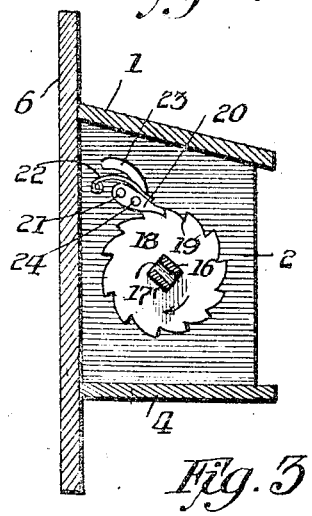
Figure 4:
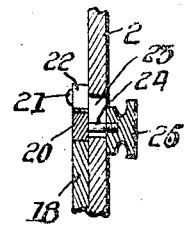

Figure 1 is a perspective view showing the reel and the appurtenant parts thereof mounted in a receptacle, which latter is provided with means whereby it may be attached to any convenient object, such as a fence, post, or wall. Fig. 2 is a front view of the same with the door of the receptacle open. Fig. 3 is a vertical sectional view on the line *x x* of Fig. 2, and Fig. 4 is a detail sectional view of part of the mechanism for retaining the reel at any desired position.

The receptacle in which the reel is arranged is composed of the inclined top 1, the sides 2 3, the bottom 4, the hinged door 5, and the back 6, these parts constituting a box or case substantially rectangular in form, with an inclined top. The back 6 of the receptacle projects above the top 1 and below the bottom 4 and is pierced at 7 7 above the top and at 8 8 below the bottom to receive nails, pins, screws, or other devices by means of which the receptacle may be secured in position on a fence, wall, post, or other object. The door 5 is attached to the side 3 of the receptacle by hinges 9 9, and the said door is formed with a hole 10, through which the clothes-line passes, and the door is held closed by means of a keeper 11 on the door, which projects into a slot 12 in the side 2 and is engaged by a pin 13, suspended from a staple 14 by a cord 15. The reel, which is arranged in the receptacle above described, is composed of a shaft 16, which is journaled in the two side walls of the receptacle, preferably square in cross-section, and carries the heads 17 and 18, the latter having ratchet-teeth 19 on its periphery and constituting at the same time one head of the reel and a ratchet-wheel by means of which the reel may be held against turning in one direction when engaged by a dog 20, that is pivotally secured at 21 upon the inside of the receptacle and is pressed against the head 18 by a spring 22. A curved slot 23 is formed in the side 2, and a pin 24, carried by the dog 20, projects through the slot and carries on its outer end a button 25, by means of which the dog may be moved out of engagement with the ratchet-teeth 19 on the head 18 when it is desired to unwind the line from the reel. The button 25 screws onto the pin 24, and when the dog has been moved out of engagement with the ratchet-teeth 19 the dog can be sustained in its elevated position by screwing up the button tightly against the side wall of the receptacle. The squared end 26 of the shaft 16 projects through the side 2 of the receptacle, and a crank 27, that is provided with a handle 28, fits on the squared end 26 and serves as a means whereby the reel my be turned to wind the line thereon. The line shown at 29 in Fig. 1 of the drawings is secured to the shaft 16 by passing one end through a hole 17′ in the shaft and then knotting the end, and when the line is wound upon the shaft one end is allowed to project through the hole 10 in the door 5.

In operation the line is attached at one end to the shaft 16 in the manner above described and is then wound upon the reel, the outer end of the line being allowed to hang out through the hole 10 in the door of the receptacle, the door being closed and secured in closed position by the pin 13. If it be desired to unwind the reel, the dog 20 is raised out of engagement with the teeth 19 of the head 18 and the line drawn out to any desired extent. To wind up the line, the crank 27 is turned so as to cause the reel to revolve in the direction of the arrow shown in Fig. 3, the dog 20 taking into the teeth 19 and retaining the reel in fixed position at any point to which it may be turned.

The apparatus as above described is of simple construction and not liable to become disarranged, and it affords an effective means of tightening up the line, since if the line be stretched and the outer end thereof secured to any object it can be tightened up by merely turning the crank 27 and will be retained in this tightened condition by the dog. The receptacle within which the reel is contained will thoroughly protect the line from the elements and prevent rotting of the line.

Having described my invention, I claim—

The combination with a receptacle having a door provided with an opening for the passage of a clothes-line, of a shaft journaled in the side walls of the receptacle, a handle attached to said shaft, heads mounted on said shaft within the receptacle, one of said heads having a toothed edge, a spring-pressed pawl pivoted on the inner side of the receptacle and engaging said toothed edge, a pin carried by said pawl, and extending through a slot in the side of the receptacle and a button screwing on said pin and engaging the side of the receptacle to hold the pawl out of engagement with the head of the reel when it is desired to unwind the clothes-line from the reel.

In testimony whereof I affix my signature in the presence of two witnesses.

GEORGE W. WILLIAMS.

Witnesses:
E. E. POTTER,
K. H. BUTLER.